United States Patent
Brower et al.

(10) Patent No.: US 7,735,327 B2
(45) Date of Patent: Jun. 15, 2010

(54) ACTIVE THERMAL INSULATION SYSTEM UTILIZING PHASE CHANGE MATERIAL AND A COOL AIR SOURCE

(75) Inventors: Keith R. Brower, Davenport, WA (US); Burt Dole, Henderson, NV (US); Thomas Neal, Boulder City, NV (US); Daniel J. Shramo, Henderson, NV (US)

(73) Assignee: Neal Energy Management LLC, Boulder City, NV (US)

( * ) Notice: Subject to any disclaimer, the term of this patent is extended or adjusted under 35 U.S.C. 154(b) by 0 days.

(21) Appl. No.: 11/779,780

(22) Filed: Jul. 18, 2007

(65) Prior Publication Data

US 2008/0034774 A1 Feb. 14, 2008

Related U.S. Application Data

(63) Continuation-in-part of application No. 11/458,657, filed on Jul. 19, 2006.

(51) Int. Cl.
*F25D 17/02* (2006.01)
(52) U.S. Cl. .............................. 62/98; 62/457.2; 62/530
(58) Field of Classification Search .................. 62/55.5, 62/100, 208, 259.1, 268, 273, 371, 405, 406, 62/441, 457.2, 530, 236; 165/48.2, 49, 53
See application file for complete search history.

(56) References Cited

U.S. PATENT DOCUMENTS

| | | | | |
|---|---|---|---|---|
| 4,203,489 A | * | 5/1980 | Swiadek ....................... 165/10 |
| 4,213,448 A | * | 7/1980 | Hebert ......................... 126/589 |
| 4,223,666 A | * | 9/1980 | Wasserman ................. 126/618 |
| 4,259,401 A | * | 3/1981 | Chahroudi et al. .......... 52/302.3 |
| 4,355,682 A | * | 10/1982 | Maloney .................... 165/48.2 |
| 4,367,788 A | | 1/1983 | Cordon |
| 4,482,010 A | | 11/1984 | Cordon |
| 4,572,864 A | | 2/1986 | Benson et al. |
| 4,679,401 A | * | 7/1987 | Lessard et al. ............... 62/55.5 |
| 5,522,216 A | * | 6/1996 | Park et al. ..................... 62/3.6 |
| 5,605,047 A | * | 2/1997 | Park et al. ..................... 62/3.6 |
| 5,626,936 A | | 5/1997 | Alderman |
| 5,770,295 A | * | 6/1998 | Alderman .................... 428/68 |
| 5,860,287 A | * | 1/1999 | O'Neal ......................... 62/201 |
| 5,875,835 A | | 3/1999 | Shramo et al. |

(Continued)

FOREIGN PATENT DOCUMENTS

DE 19813562 A1 11/1998

(Continued)

*Primary Examiner*—Mohammad M Ali
(74) *Attorney, Agent, or Firm*—Greenberg Traurig

(57) ABSTRACT

An active thermal insulation system is disclosed. The system utilizes a cool air source or ambient air below a threshold temperature in conjunction with a phase change material and/or conventional insulation. In a controlled manner, the cooled air or ambient air facilitates the transition of the phase change material from a substantially liquid state to a substantially solid state allowing the solid phase change material to absorb heat. Cooled air or ambient air may be directed to the phase change material via a gap or plenum capable of introducing the cooled air or ambient air adjacent to the phase change material. A fan, blower or air intake device may be used to direct ambient air to the gap or plenum.

35 Claims, 9 Drawing Sheets

U.S. PATENT DOCUMENTS

| | | | |
|---|---|---|---|
| 5,983,655 A * | 11/1999 | Kistner et al. | 62/208 |
| 6,037,032 A | 3/2000 | Klett et al. | |
| 6,077,597 A | 6/2000 | Pause | |
| 6,104,611 A * | 8/2000 | Glover et al. | 361/700 |
| 6,356,825 B1 * | 3/2002 | Takenaka et al. | 701/36 |
| 6,557,313 B1 | 5/2003 | Alderman | |
| 6,645,598 B2 | 11/2003 | Alderman | |
| 6,811,852 B2 | 11/2004 | Alderman | |
| 6,857,238 B2 | 2/2005 | Alderman | |
| 6,858,068 B2 * | 2/2005 | Smith et al. | 96/127 |
| 2003/0131623 A1 * | 7/2003 | Suppes | 62/324.1 |
| 2005/0281979 A1 | 12/2005 | Toas et al. | |

FOREIGN PATENT DOCUMENTS

EP      0306202 A2      3/1989

* cited by examiner

000# ACTIVE THERMAL INSULATION SYSTEM UTILIZING PHASE CHANGE MATERIAL AND A COOL AIR SOURCE

CROSS-REFERENCE TO RELATED APPLICATIONS

This application is a continuation-in-part of application Ser. No. 11/458,657 filed Jul. 19, 2006.

FIELD OF THE INVENTION

The embodiments of the present invention relate to a system of enhancing the efficiency of a thermal insulation system utilizing phase change material and a cool air source.

BACKGROUND

Insulation has been utilized for decades to control the flow of tempered air. For example, insulation substantially prevents heat from flowing from a high temperature zone to a cool temperature zone. For example, the cool zone may be an interior of a structure such that the insulation helps maintain the cool internal temperature. Likewise, the interior temperature may be heated so that the insulation helps maintain the heated internal temperature. In other words, the insulation slows the rate of heat transfer.

Unfortunately, a change in either the inside or outside temperature is instantly reflected in the change in the rate of heat flow. Therefore, in order to maintain the desired internal temperature, the heating and cooling equipment must be able to respond quickly to changes in the temperature difference. Such is not always easy since the equipment must overcome a large volume of air or a large mass in the internal zone, both of which resist rapid temperature changes. Accordingly, during rapid external temperature fluctuations, the internal temperature is often either higher or lower than desired.

There lacks a method of maintaining a relatively constant rate of heat flow so as to maximize the efficiency of conventional heating and cooling equipment and to improve the correlation between the desired internal temperature and the actual internal temperature. Such a method would minimize the temperature variations and the energy output required to maintain a desired internal temperature.

Conventional forms of insulation comprise fiberglass rolls, batts, blankets and loose fill. Other types of insulation include cellulose, mineral wool and spray foam.

Materials known as phase change materials ("PCMs") have also gained recognition as materials which alone, or in combination with traditional insulation, reduce home heating or cooling loads, thereby producing energy savings for consumer.

PCMs are solid at room temperature but as the temperature increases the PCMs liquefy and absorb and store heat, thus potentially cooling an internal portion of a structure. Conversely, when the temperature decreases, the PCMs solidify and emit heat, thus potentially warming the internal portion of the structure. Systems using PCMs with traditional insulation materials allow the PCMs to absorb higher exterior temperatures during the day and dissipate the heat to the internal portion of the structure at night when it tends to be cooler.

Known PCMs include perlite, paraffin compounds (linear crystalline alkyl hydrocarbons), sodium sulfate, fatty acids, salt hydrates and calcium chloride hexahydrate. While this list is not exhaustive, it is representative of the materials which exhibit properties common to PCMs.

In most current systems, both conventional insulation and PCMs are used in one or more known configurations. For example, U.S. Pat. No. 5,875,835 to Shramo and assigned to Phase Change Technologies, Inc., and incorporated herein by this reference, discloses packaged PCM placed between two layers of conventional insulation. U.S. patent application Ser. No. 11/061,199 to Brower and also assigned to Phase Change Technologies, Inc., and incorporated herein by this reference, discloses packaged PCMs used in combination with a single layer of conventional insulation. Regardless of the configuration, in high temperature environments, PCMs may remain liquefied for long periods of time such they are ineffective until such time that the ambient temperature drops below the PCM's transition temperature. Unfortunately, in warm climates, like desert locations in the Southwest United States, the temperatures may not drop below the PCM's transition temperatures for days or longer.

Consequently, there is a need for a controllable system and/or method that is able to return a liquefied PCM to its solid state in response to, for example, ambient temperatures exceeding the PCM's transition temperature. Such a controllable system and/or method is energy efficient and reduces or eliminates peak energy loads of those utilities providing the electricity or gas to a service area incorporating such systems and/or methods.

SUMMARY

Accordingly, a first system embodiment of the present invention comprises: a phase change material; a cool air source operable to cool air below a transition temperature of the phase change material; and means for controlling the cool air source such that cool air can be directed from the cool air source to an area proximate the phase change material.

An alternate system embodiment comprises a phase change material positioned within a building structure adjacent to a wall or ceiling such that a gap exists between the phase change material and said wall or ceiling; means for cooling air; and means for controllably directing ambient air, cooled air or a combination thereof through the gap to facilitate a phase change of the phase change material.

A first method embodiment of the present invention comprises: providing phase change material in a subject structure; providing a cool air source; and when needed, activating the cool air source to provide cool air proximate the phase change material, said cool air being below a transition temperature of the phase change material.

An alternate method embodiment of insulating a structure whereby said structure includes a wall or ceiling and phase change material separated by a gap comprises: measuring an ambient temperature; controlling activation and de-activation of a source of cooled air such that cooled air is directed into said gap in response to said ambient temperature being above a threshold temperature; and directing ambient air into said gap in response to said ambient temperature being below a threshold temperature.

In one embodiment, cool air is provided to an attic space causing PCM placed in the attic to solidify. In other embodiments, cool air is channeled past adjacent PCM via ducts, plenums or other air passageways. In yet other embodiments, conventional insulation is used in combination with the PCM. In other embodiments, ambient air below a threshold temperature is used to cool phase change material.

Other advantages, objects, variations and embodiments of the present invention will be readily apparent from the following drawings, detailed description, abstract and claims.

DETAILED DESCRIPTION

Figure 1:
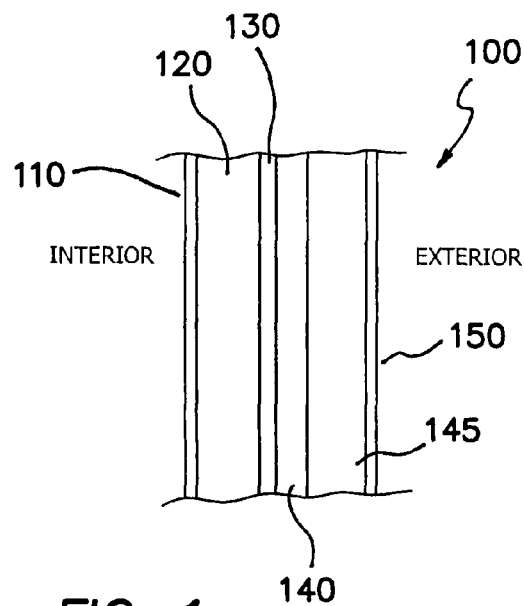
FIG. 1 illustrates a view of a wall supporting a PCM sandwiched between traditional insulation (i.e., the RCR model)

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention claimed.

Reference is now made to the figures wherein like parts are referred to by like numerals throughout. FIG. 1 shows a cross-sectional view of a resistance-capacitance-resistance (RCR) model generally referred to as reference numeral 100. The cross-section comprises an interior drywall 110, first insulation layer 120, PCM 130, second insulation layer 140 and exterior wall portion 150.

Figure 2:
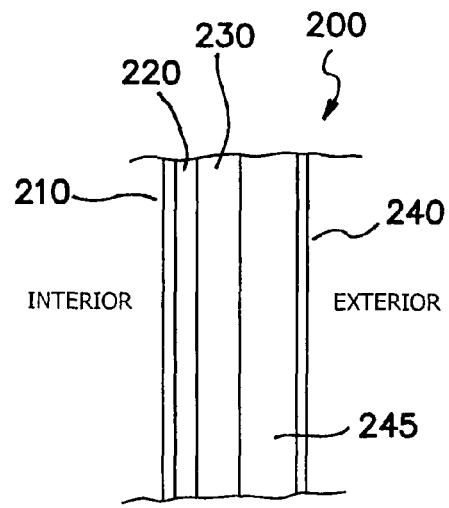
FIG. 2 illustrates a cross-sectional view of a wall supporting a PCM and one layer of traditional insulation (i.e., the RC model)

FIG. 2 shows a cross-sectional view of a resistance-capacitance (RC) model 200 of the present invention. The cross-section comprises an interior drywall 210, PCM 220, insulation layer 230 and exterior wall portion 240. Similar to FIG. 1, there is shown a space 245 between the exterior wall portion 240 and the insulation layer 230. This arrangement mimics a typical attic. However, with other walls, the space 245 may be reduced or eliminated.

Figure 3:
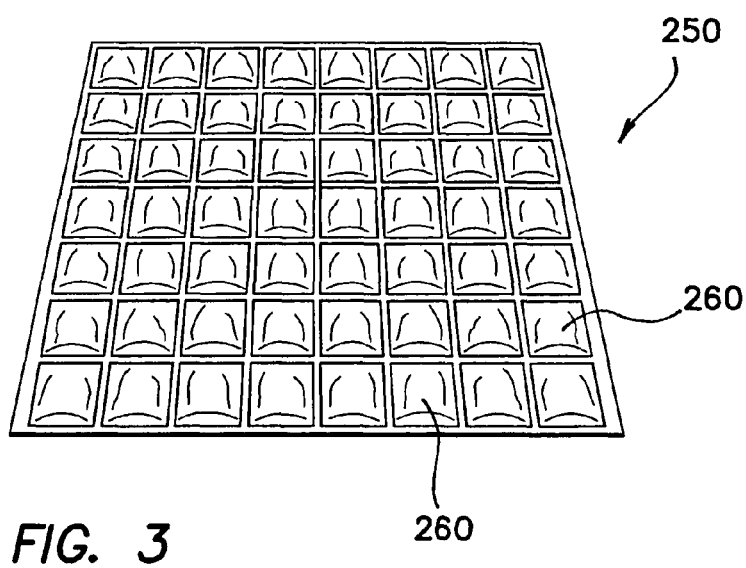
FIG. 3 illustrates a sheet of packaged PCM.

FIG. 3 shows a sheet of packaged PCM 250 comprising a plurality of pockets 260 suitable for containing the PCM. While a square configuration is shown, those skilled in the art will recognize that other shapes (e.g., rectangular) are possible.

While PCMs have proven reliable alone, or in combination with conventional insulation, to facilitate the heating and cooling of interior spaces, they are not without limitations. PCMs struggle in warm weather climates, like those experienced in the Southwest United States, where ambient temperatures may exceed the PCM's transition temperature for extended periods of time. Consequently, in such environments, the PCM may remain in a liquid state for extended periods of time thereby reducing the PCM's usefulness. That is, PCMs are useful as long as they change phase (liquid to solid and vice versa) routinely since they store and emit heat as a result. For example, when the PCM remains in a liquid state it is unable to store any additional heat such that it provides no further benefit until the PCM begins changing phase back to a solid.

The embodiments of the present invention provide a system for lowering the temperature of a PCM when ambient temperatures are, or are predicated to remain, above the PCM's transition temperature (e.g., 80° F.) for brief or extended periods of time.

FIGS. 4 through 9 show various system configurations which facilitate the embodiments of the present invention and which are suitable for residential, commercial and industrial structures.

Figure 4:
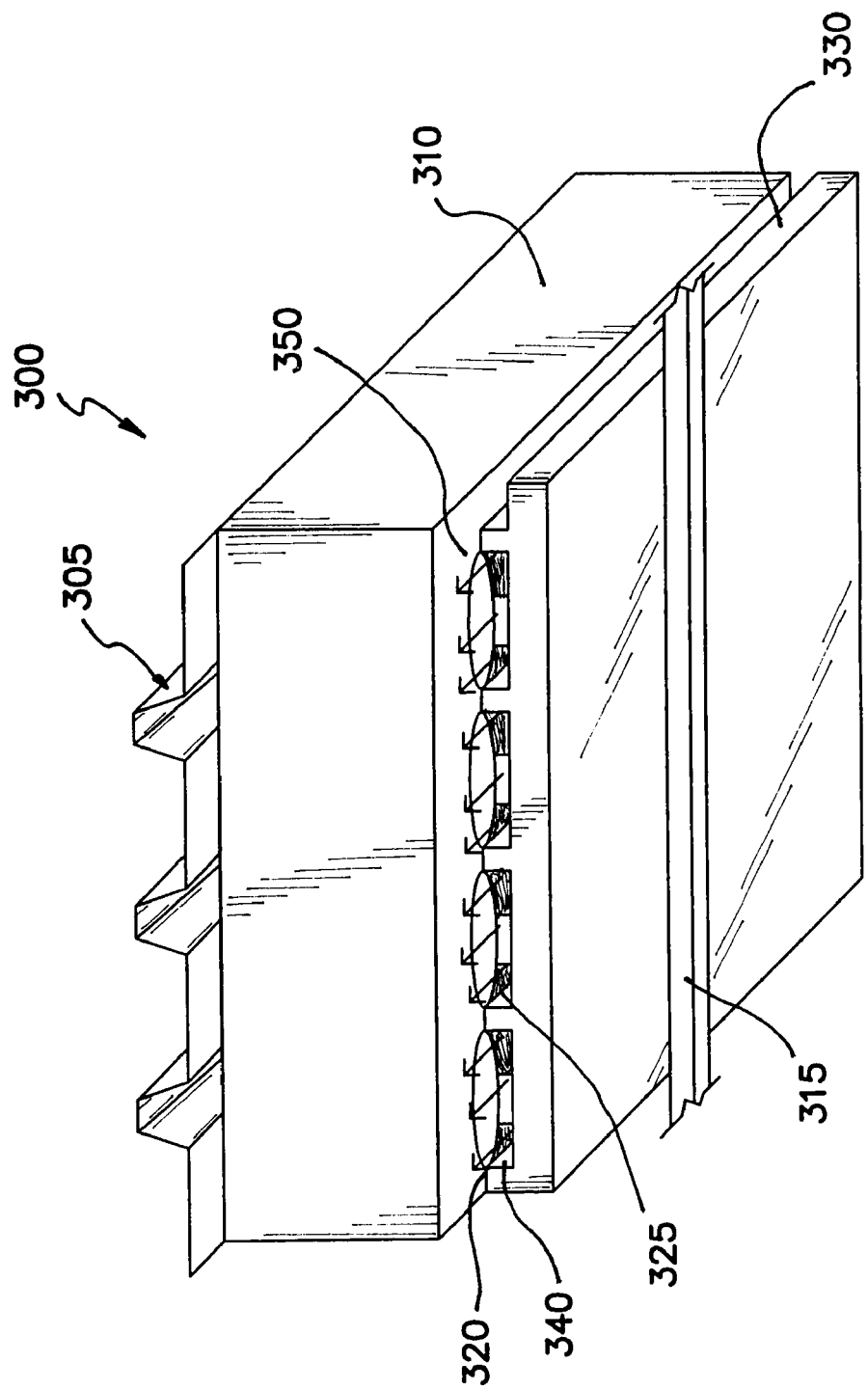
FIG. 4 illustrates a first system configuration of the present invention.
Figure 13:
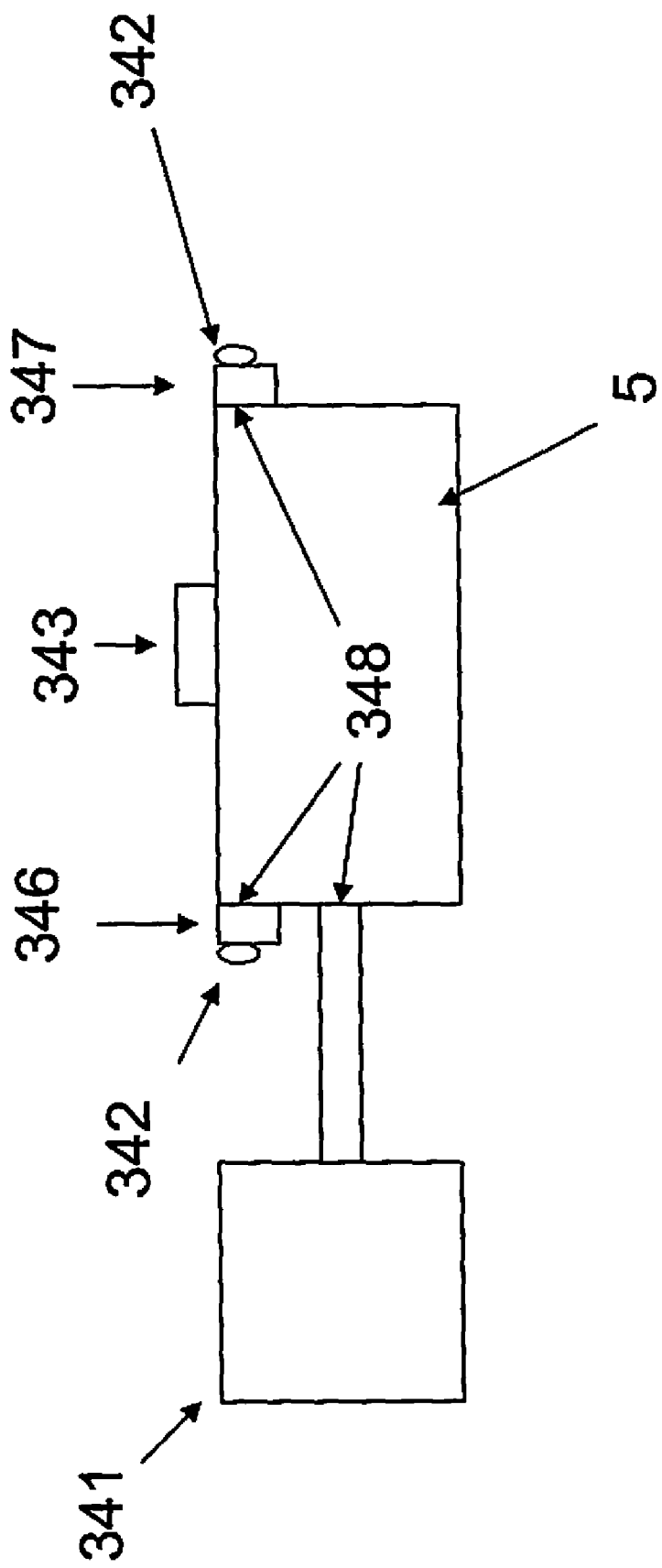
FIG. 13 illustrates a block diagram showing various components of the embodiments of the present invention.

FIG. 4 shows a first system configuration 300, positioned below a roof deck 305, comprising a first conventional insulation layer 310, PCM layer 320 and a second conventional insulation layer 330. The roof deck 305 is positioned above the first conventional insulation layer 310 while deck joists 315 support both conventional insulation layers 310, 330 and the PCM layer 320. As shown, the second conventional insulation layer 330 includes multiple channels 340 on an upper surface thereof. The channels 340 provide a location for placement of packaged PCM 325. Moreover, the channels 340 are able to receive and direct cool air 350 provided by a cool air source 341 (as shown in FIG. 13 along with other system components relative to a structure denoted by reference numeral 5) such as one or more air conditioning units. The channels 340 allow the cool air 350 to directly contact the packaged PCM 325.

The cool air source 341 may be manually and/or automatically operated. In a manual mode, a user determines when, and for how long, to run the cool air source. In an automatic mode, system sensors 342 in communication with a controller 343 determine when, and for how long, to run the cool air source 341. In either mode, the objective is to run the cool air source 341 as needed (e.g., until the PCM 325 is changed from a substantially liquid phase to a substantially solid phase). The ambient temperature, expected ambient temperatures over time, time of day and type of PCM 325 may collectively play a role in determining when, and for how long, to run the cool air source 341. The controller 343 is programmed to utilize all or some of the aforementioned information in determining when, and for how long, to run the cool air source. In a manual mode, a user having sufficient understanding of the aforementioned information is able to adequately control the cool air source 341.

In one exemplary automatic system, a local system is controlled in response to temperature and the time of day. Accordingly, when sensors 342 provide feedback to the controller 343 indicating that a temperature proximate the PCM 325 is above the PCM's transition temperature and the time of day is within an acceptable pre-established range of times of day, the cool air source 341 is activated. The cool air source 341 may be run for a fixed amount of time (e.g., 30 minutes) or additional system sensors may provide feedback indicating that the PCM 325 has returned to a substantially solid phase thereby triggering the controller 343 to deactivate the cool air source 341. Acceptable times of day are ideally during off-peak hours of a subject energy-producing utility providing electricity and/or gas to the area wherein the active PCM system is located.

It is also conceivable that the subject energy-producing utility may control a plurality of residential and/or commercial cool air sources. In such an embodiment, one or more central controllers maintained and/or managed by the utility are responsible for a plurality of cool air sources installed at homes and businesses within the utility's service area. In this manner, the utility is better able to control its energy load thus ensuring that demand remains level within a suitable range and does not spike or peak dramatically.

Figure 5:
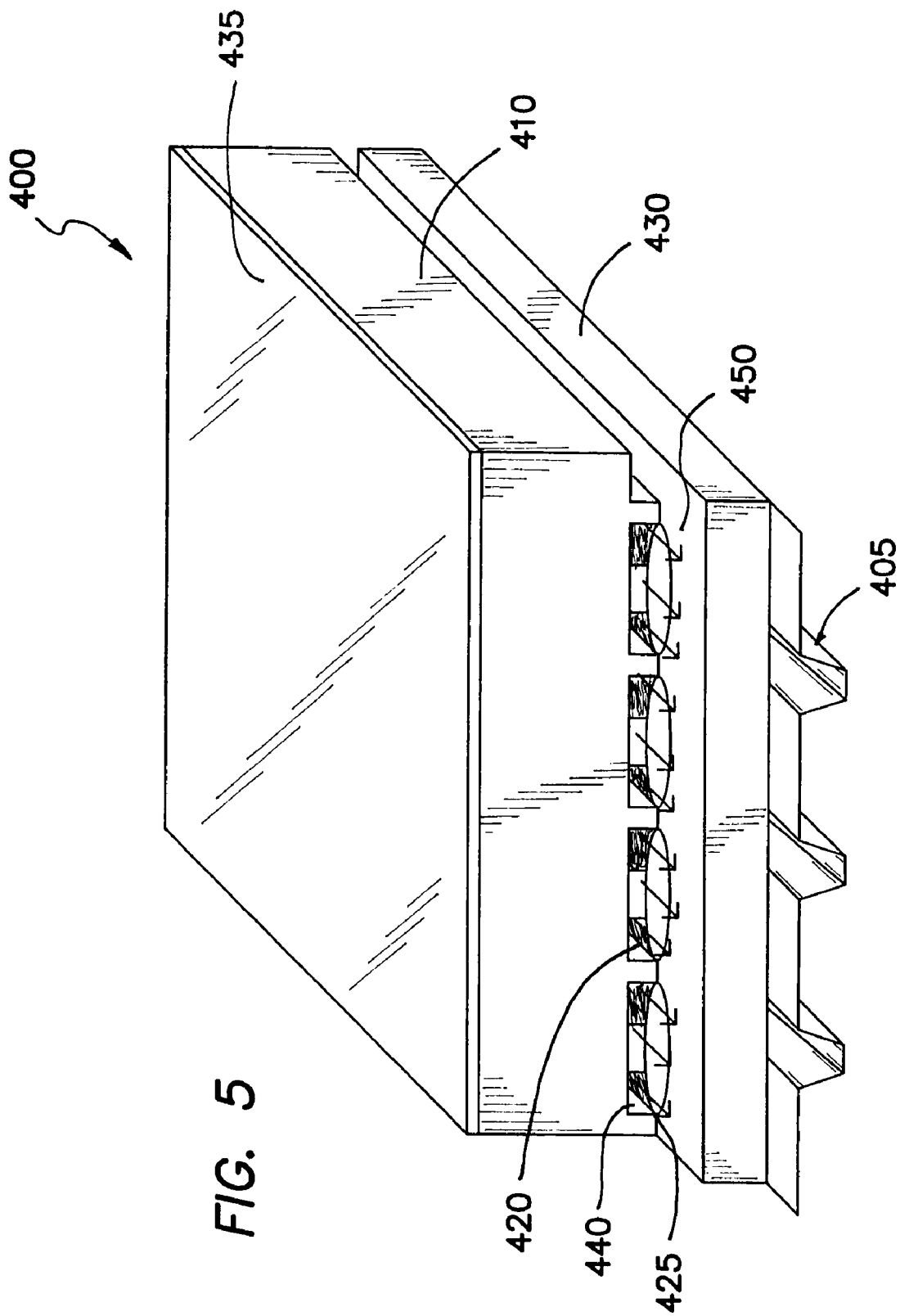
FIG. 5 illustrates a second system configuration of the present invention.

FIG. 5 shows a second system configuration 400, positioned above a roof deck 405, comprising a first conventional insulation layer 410, PCM layer 420 and second conventional insulation layer 430. A membrane 435 positioned above the first conventional insulation layer 410 protects the first conventional insulation layer 410 from direct sunlight and energy. The membrane 440 may be any suitable material and may be reflective to repel thermal energy from the sun. In this configuration 400, channels 440 are provided on a lower surface of the first insulation layer 410. Again, the channels 440 provide space for the packaged PCM 425 and the flow of cool air 450 past the packaged PCM 425.

Figure 6:
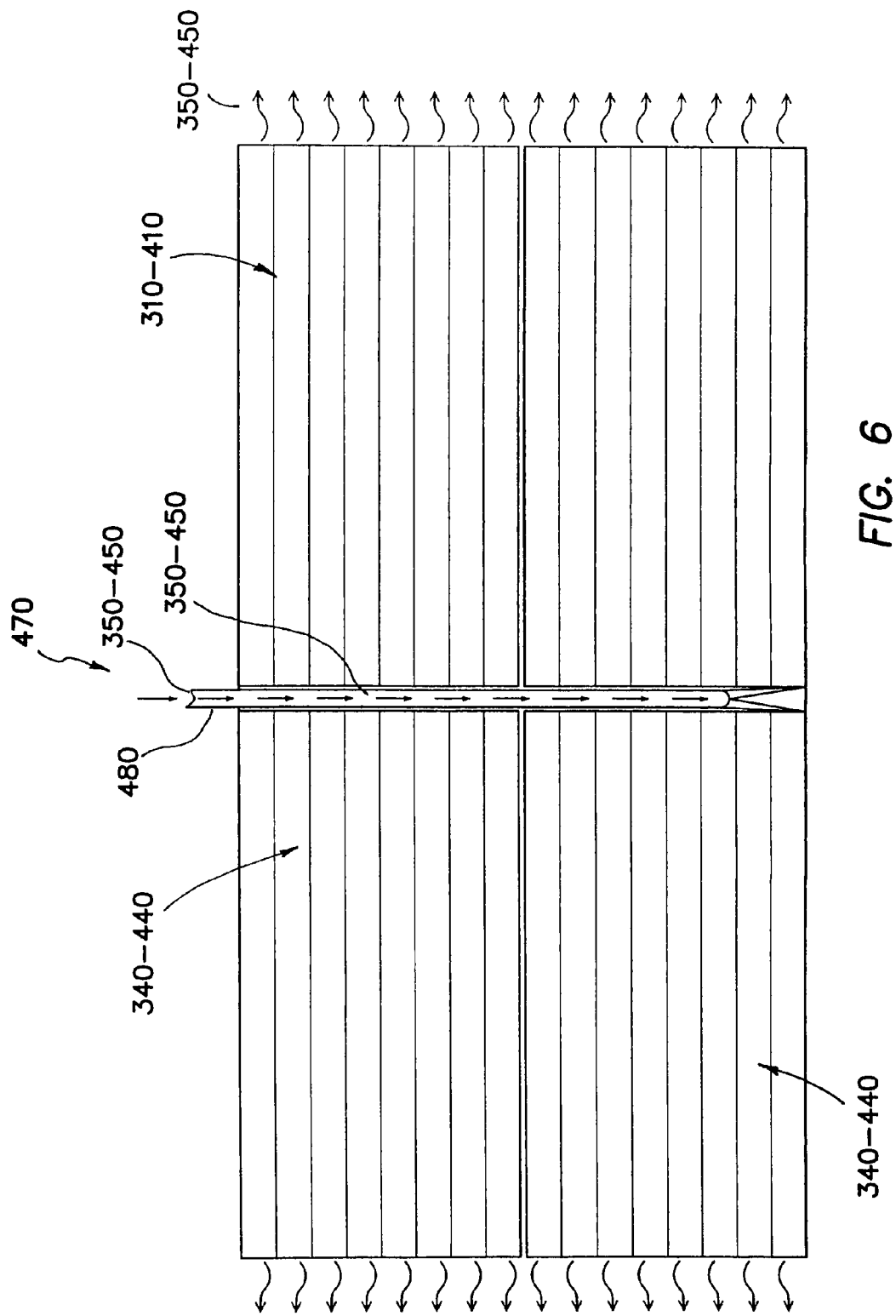
FIG. 6 illustrates an overheard view of the first and second system configurations with an airflow source.

FIG. 6 shoes an overhead view of one possible air flow pattern 470 suitable for the system configurations 300, 400 shown in FIGS. 4 and 5. Moreover, the air flow pattern 470 may be used in any of the embodiments shown herein or covered by the claims hereof. The air flow 350, 450 is channeled through a manifold or duct 480 positioned between insulation layers 310, 330 and 410, 430. The manifold or duct 480 includes a series of opening (not shown) along its length to allow the cool air flow 350, 450 to exit therethrough. As the air flow 350, 450 exits the manifold or duct 480 is travels along the channels 340, 440 in the corresponding insulation layer 330, 410. In this arrangement, the air flow 350, 450 can be efficiently forced through the duct 480 and dispersed evenly through the channels 340, 440. In other arrangements, the air flow 350, 450 can be forced directly into the channels 340, 440.

Figure 7:
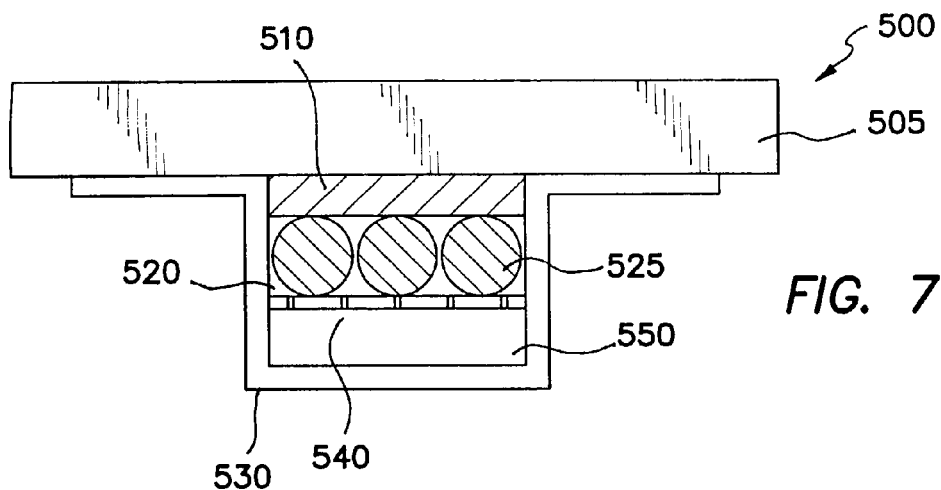
FIG. 7 illustrates a third system configuration of the present invention.

FIG. 7 shows a cross-sectional view of a third system configuration 500, positioned below a roof joist or rafter 505, comprising a conventional insulation layer 510 and PCM layer 520. The conventional insulation layer 510 and PCM layer 520 are secured within a container 530 by a support member 540. The container may be made of any suitable material including plastic or metal. A space 550 defined below the support member 540 receives and directs cool air as needed. The support member 540 is ideally fabricated of a mesh, wire or any material or configured material that allows the cool air to act on the PCM layer 520. Ideally, the cool air is able to interact directly with the packaged PCM 525 thereby causing the fastest transition possible. The container 530 may be attached to, or integrated with, the rafter 505 using any well-known means. A single structure may require installation of multiple containers 530 to cover a subject roof area. Alternatively, the container 530 may be large enough to cover a subject roof area and maintain a corresponding conventional insulation layer 510 and PCM layer 520.

Figure 8:
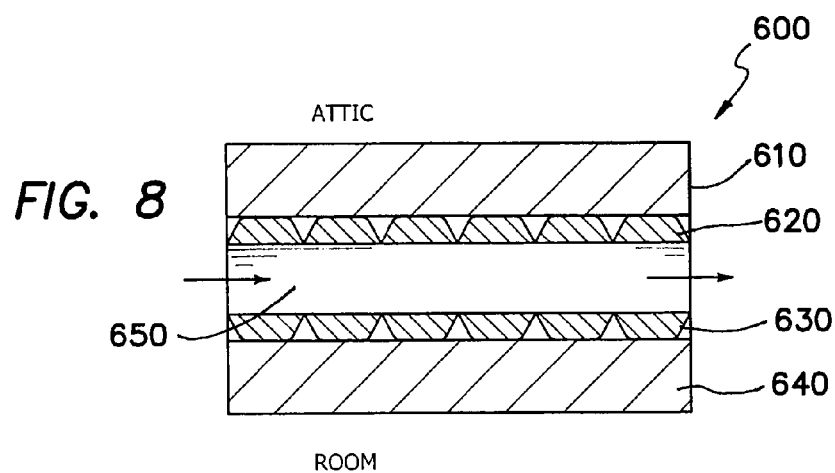
FIG. 8 illustrates a fourth system configuration of the present invention.

FIG. 8 shows a cross-sectional view of a fourth system configuration 600 comprising a first conventional insulation layer 610, a first PCM layer 620, a second PCM layer 630 and a second conventional insulation layer 640. In this configuration, the two PCM layers 620, 630 are positioned on opposite sides of an air duct, plenum or passageway 650. As with the previous configurations, cool air is provided to the passageway 650 thereby causing a substantially liquid PCM to return to a substantially solid PCM. Again, the materials or configuration of materials forming the duct, plenum and passageway 650 permit the cool air to act on packaged PCM 625.

Figure 9:
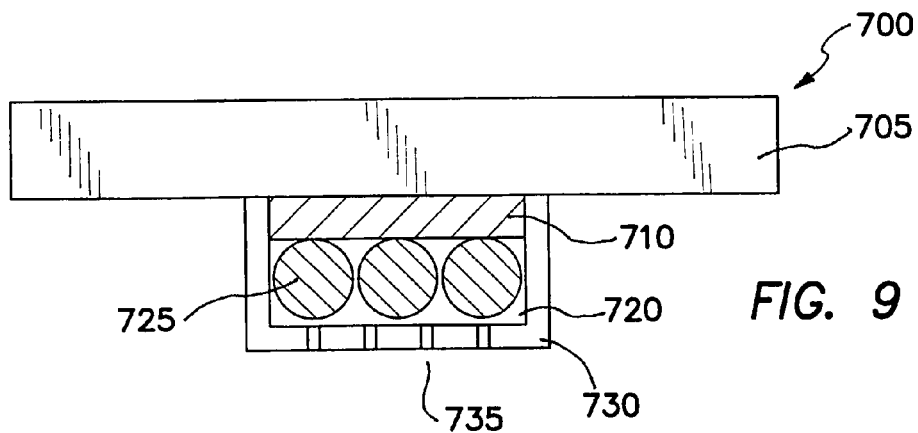
FIG. 9 illustrates a fifth system configuration of the present invention.

FIG. 9 shows a cross-sectional view of a fifth system configuration 700, positioned below a roof joist or rafter 705 and within an attic area, comprising a conventional insulation layer 710 and PCM layer 720. A container 730, with one or more meshed or open surfaces 735, maintains the conventional insulation layer 710 and PCM layer 720 near an underside surface of a roof. In this configuration, cool air is directed into the entire attic space to facilitate a phase change of the packaged PCM 725. In another configuration, the conventional insulation layer 710 and PCM layer 720 are positioned between rafters directly above a subject structure's ceiling.

Figure 12:
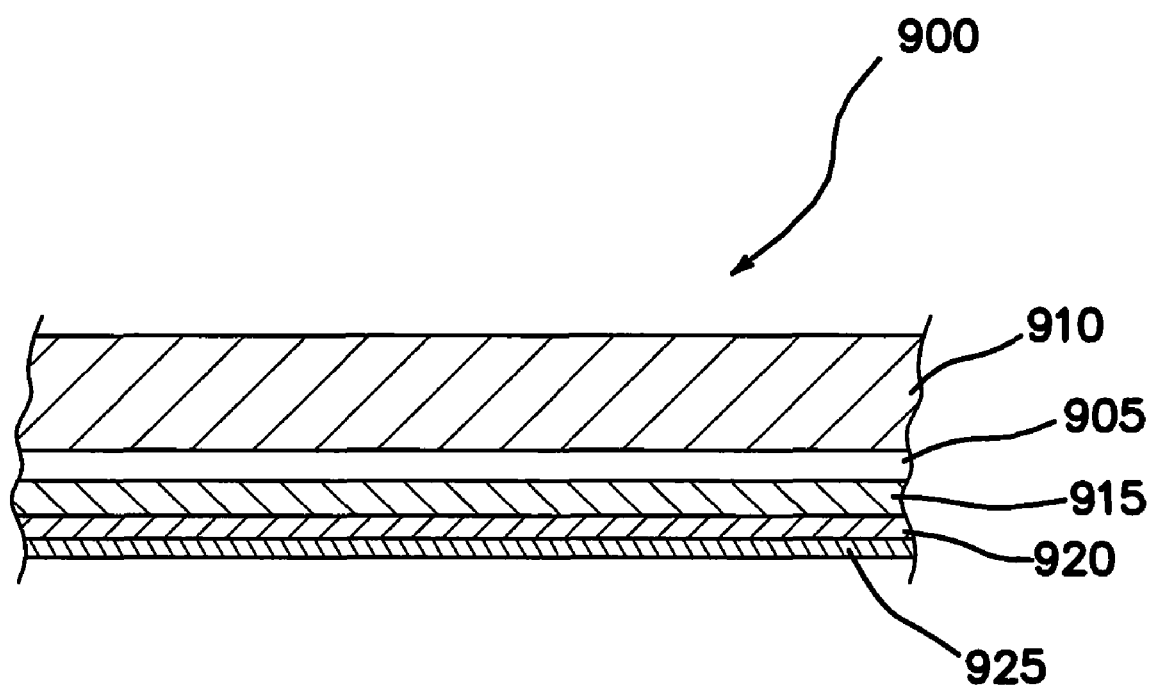
FIG. 12 illustrates a sixth system configuration of the present invention.

FIG. 12 shows a cross-sectional view of a sixth configuration 900 of an active system according to the embodiments of the present invention. The sixth configuration 900 comprises a gap 905 separating an insulated wall or ceiling 910 from a PCM 915, insulation layer 920 and construction material 925 (e.g., dry wall). The gap or plenum 905 provides a conduit for the passage of air. In one embodiment, when the ambient air is below a threshold temperature, ambient air is circulated through the plenum 905 and when the ambient air is above a threshold temperature, air-conditioned air is directed and run through the plenum 905. Depending on the phase change material, a suitable threshold temperature may range from 75° to 85°. One or more temperature sensors 342 determine the temperature of the ambient air to determine whether a controller, processor or similar device will direct ambient air or air-conditioned air to, and through, the gap 905 via an opening 348 or other entry point. In either instance, the ambient air or air-conditioned air is passed through the gap 905 and may leave via an exit opening to the atmosphere removing excess heat emitted from the phase change material. The controller 343 may control the entry and exit openings. Combinations of cooled air and ambient air may also be directed through said gap 905. A system based on this sixth embodiment, may reduce peak heating load by 35% to 60%.

In one embodiment, a fan, blower or other air-moving device 346 is triggered or activated by the controller 343 to force ambient air through the gap 905. Alternatively, an air intake device 347 (e.g., vacuum) may be used to draw ambient air into the gap 905. It is also conceivable that ambient air is permitted to naturally flow through the gap or plenum 905.

As shown in FIG. 12, the configuration 900 employs a Resistance-Capacitance-Resistance (RCR) (i.e., insulation-phase change material-insulation) model. The configuration may also employ a Resistance-Capacitance model. With new construction, PCM 915 and an insulating layer 920 are inserted between the building frame insulation and an inside wall board with a gap left therebetween. With a retrofit, a full panel of PCM 915, insulation 920 and wall construction material 925 are used. In a ceiling embodiment in large commercial buildings, the PCM 915 may be bonded to insulation material and the assembly may be hanged from the ceiling using structural members for providing a gap between the insulated ceiling and the assembly. Regardless of the application, the PCM 915 is packaged in vacuum-sealed pouches or cells 260 which can be bonded to insulating board with standoffs to form the gap or plenum 905. The entire assembly may be bonded to a construction material to create an integrated panel for easy handling and compiling.

Although not shown, each of the systems described herein may also incorporate an outlet for exhausting heat emitted by the PCM during the liquid phase to solid phase transition. The emitted heat integrates with the cool air and is exhausted accordingly. The outlet may lead to the atmosphere or any desired location.

It will be understood by those skilled in the art that countless other system configurations are conceivable and for the sake of brevity are not disclosed herein but are intended to be covered by the claims below.

Figure 10:
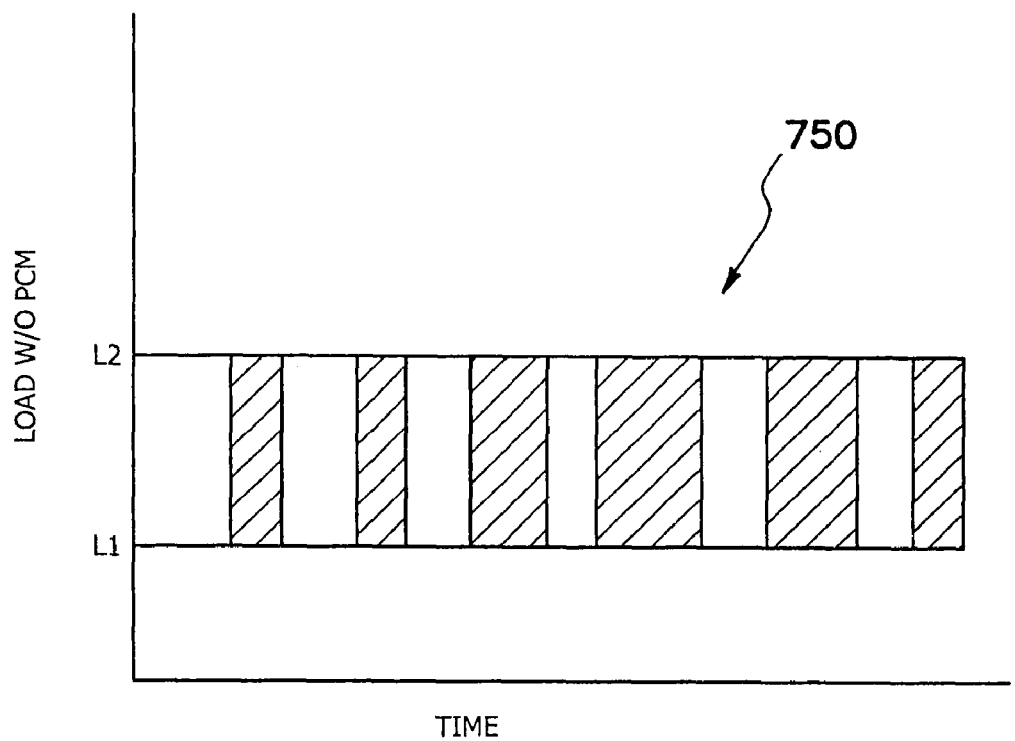
FIG. 10 illustrates a graphical representation of a Load v. Time for a residential and/or commercial facility without the embodiments of the present invention compared to the same system with the embodiments of the present invention in place.
Figure 10:
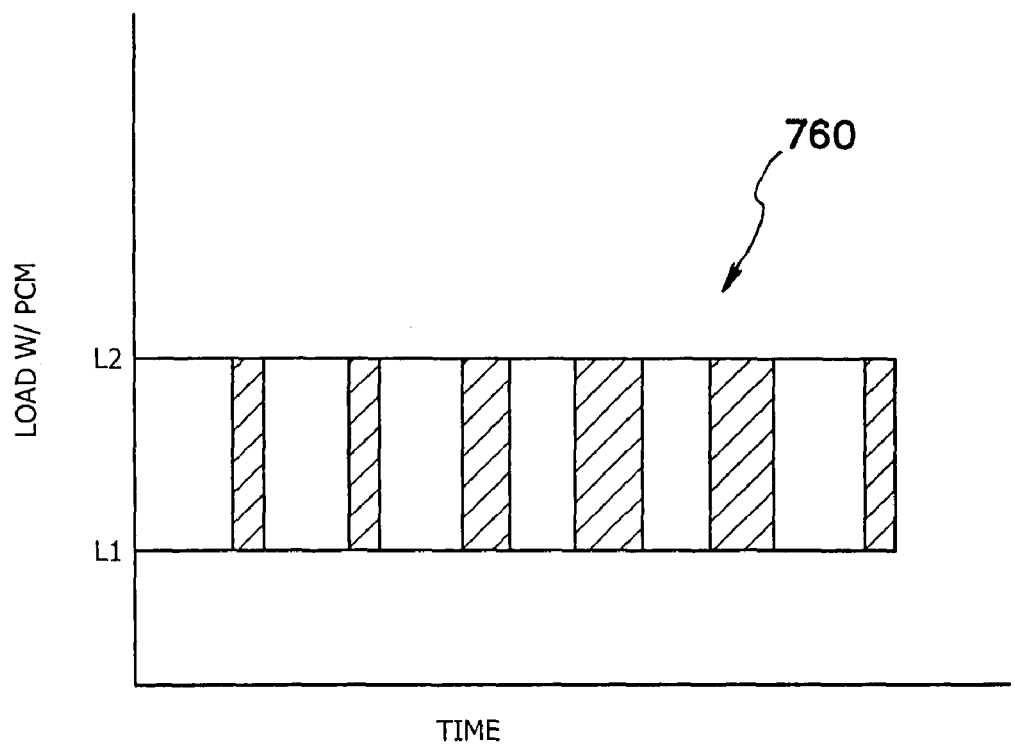
Figure 11:
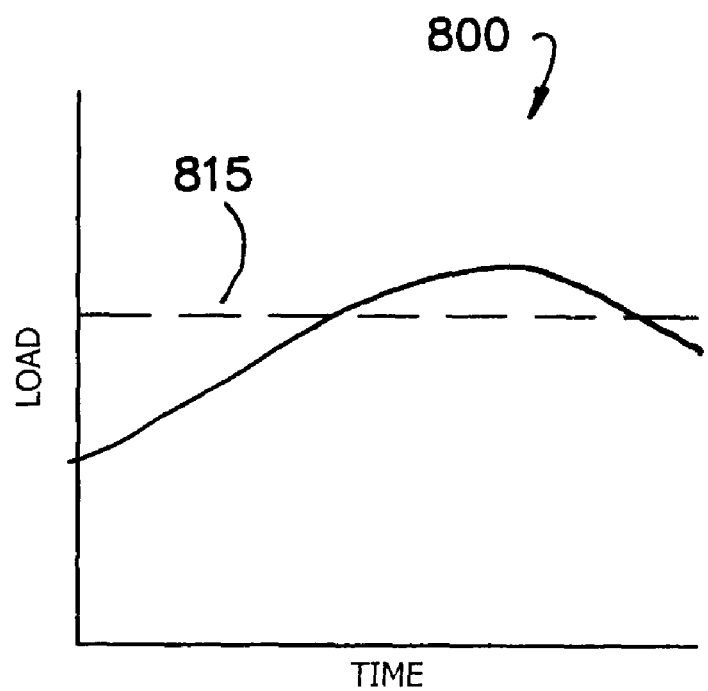
FIG. 11 illustrates a smooth graphical representation of the graphs represented in FIG. 10 as realized by a energy provider over a wide area of similar residences and/or commercial facilities.
Figure 11:
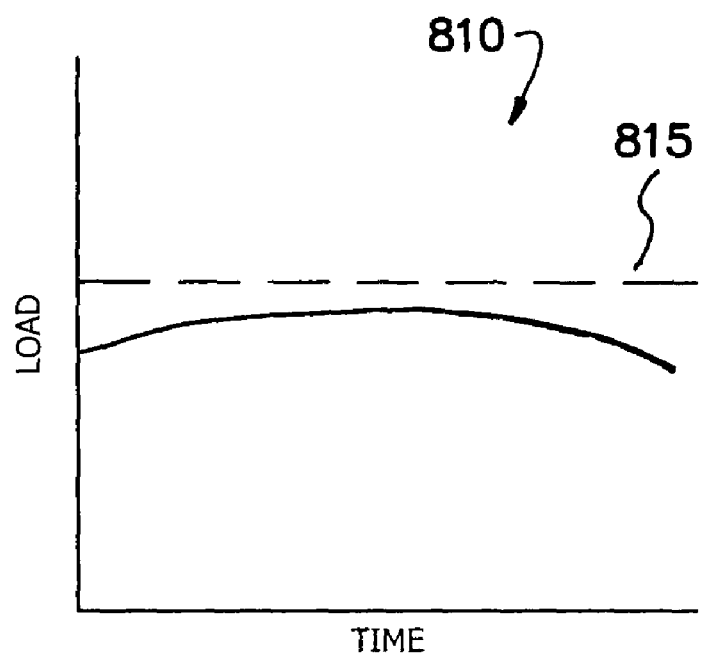

FIG. 10 shows a graphical representation (load v time) of a none-PCM system 750 and a PCM system 760 at a residence or commercial facility. Both graphs depict the none-PCM and PCM system 750, 760 in relation to a standard load (L1) related to electric usage without activated air conditioning and a second load (L2) including an activated air conditioning component. Both graphs 750, 760 clearly depict that the use of air conditioning increases the energy load. However, with the none-PCM system 750, the time component of each air conditioning activation is greater than a corresponding time component for the PCM system 760. Thus, the air conditioning cools the subject area in the same manner but the air conditioning is run for shorter periods of time with the PCM system 760 thereby saving energy. FIG. 11 shows a smooth graph depicting a collective load over time representation.

FIG. 11 shows a graphical comparison (load v. time) between an active PCM system, like that described herein, and a non-active or passive PCM system. The graph 800 representing a non-active PCM system clearly depicts a peak load 810, exceeding a undesired load 815, while the graph representing the active PCM system depicts a level load over time without any obvious peak load or spike above the undesired load 815. In other words, with the active PCM system, the load of an energy provider is manageable such that peak loads can be controlled, reduced and/or eliminated.

Although the invention has been described in detail with reference to several embodiments, additional variations and modifications exist within the scope and spirit of the invention as described and defined in the following claims.

We claim:

1. A thermal insulation system for residential and/or commercial buildings comprising:
   a packaged phase change material positioned within said residential and/or commercial buildings adjacent to a wall or ceiling such that a gap exists between the phase change material and wall or ceiling, said wall or ceiling subject to uncontrolled external atmospheric conditions, including solar-generated heat, said phase change material configured to store solar-generated heat entering into said residential and/or commercial buildings but prior to said solar-generating heat reaching an internal living or working space associated with residential and/or commercial buildings;
   an electromechanical air conditioning system to produce artificial air conditioned cooled air and configured to send the artificial air conditioned cooled air directly to said gap without first sending the artificial air conditioned cooled air to the internal living or working space associated with residential and/or commercial buildings; and
   a controller configured to cause naturally cool atmospheric air external to said residential and/or commercial buildings, the artificial air conditioned cooled air generated by said electromechanical air conditioning system or a combination thereof to enter the gap to selectively facilitate a phase change of the phase change material, said controller further configured to:
   a. cause the naturally cool air to enter into said gap when the naturally cool air is being at a temperature below a transition temperature of said phase change material; and
   b. cause the artificial air conditioned cooled air being at a temperature below the transition temperature of the phase change material to enter said gap when naturally cool air is above the transition temperature of said phase change material and said controller responsive automatically to one or more of the following parameters:
   a. temperature of air adjacent to said phase change material;
   b. external air temperature;
   c. state of said phase change material; and
   d. time of day.

2. The system of claim 1 further comprising insulation positioned against a surface of said packaged phase change material opposite said gap.

3. The system of claim 1 further comprising air-moving means for forcing naturally cool atmospheric air external to said residential and/or commercial buildings into said gap.

4. The system of claim 3 wherein the air-moving means is a fan or blower.

5. The system of claim 1 further comprising air intake means for drawing naturally cool atmospheric air external to said residential and/or commercial buildings into said gap.

6. The system of claim 1 wherein said phase change material is packaged in vacuum cells and connected to a layer of insulation.

7. The system of claim 1 further comprising one or more sensors for measuring a temperature of the naturally cool atmospheric air external to said residential and/or commercial buildings and a temperature adjacent to the phase change material.

8. The system of claim 1 further comprising an outlet and means for actively exhausting cooled air or naturally cool atmospheric air once said cooled air or naturally cool atmospheric air has absorbed heat emitted by said phase change material during a liquid to solid phase transition.

9. The system of claim 1 wherein said controller is further configured to cause a combination of naturally cool air and artificial air conditioned cooled air to enter the gap when the naturally cool air is near the transition temperature of the phase change material.

10. A thermal insulation system for residential and/or commercial buildings comprising:
   a packaged phase change material positioned within said residential and/or commercial buildings adjacent to a wall or ceiling such that a gap exists between the phase change material and wall or ceiling, said wall or ceiling subject to uncontrolled external atmospheric conditions, including solar-generated heat, said phase change material configured to store solar-generated heat entering said residential and/or commercial buildings but prior to said solar-generating heat reaching an internal living or working space associated with residential and/or commercial buildings;
   an electromechanical air conditioner system for producing artificial air conditioned cooled air and directing artificial air conditioned cooled air through said gap to facilitate a phase change of the packaged phase change material, said electromechanical air conditioner system configured to send artificial air conditioned cooled air directly to said gap without first sending the artificial air conditioned cooled air to the internal living or working space associated with residential and/or commercial buildings;

means for forcing or drawing naturally cool atmospheric air external to said residential and/or commercial buildings below a threshold temperature through said gap to facilitate a phase change of the packaged phase change material; and a controller for activating and de-activating said electromechanical air conditioner system and controlling said means for forcing or drawing naturally cool atmospheric air external to said residential and/or commercial buildings causing naturally cool atmospheric air, the artificial air conditioned cooled air or a combination thereof to enter into said gap to selectively facilitate a phase change of the phase change material, said controller further configured to:

a. cause the naturally cool air to enter into said gap when the naturally cool air is being at a temperature below a transition temperature of said phase change material; and b. cause the artificial air conditioned cooled air being at a temperature below the transition temperature of the phase change material to enter said gap when the naturally cool air is above the transition temperature of said phase change material and said controller responsive automatically to one or more of the following parameters:

a. temperature of air adjacent to said phase change material;

b. external air temperature;

c. state of said phase change material; and d. time of day.

11. The system of claim 10 further comprising one or more sensors operable to determine the temperature of the naturally cool atmospheric air external to said residential and/or commercial buildings and a temperature adjacent to the phase change material.

12. The system of claim 10 further comprising insulation positioned against a surface of packaging of said phase change material opposite said gap.

13. The system of claim 10 further comprising a fan or blower for forcing naturally cool atmospheric air external to said residential and/or commercial buildings into said gap.

14. The system of claim 10 further comprising a vacuum for drawing naturally cool atmospheric air external to said residential and/or commercial buildings into said gap.

15. The system of claim 10 wherein said phase change material is packaged in vacuum cells and connected to a layer of insulation.

16. The system of claim 10 further comprising an outlet and means for actively exhausting cooled air or naturally cool atmospheric air once said cooled air or naturally cool atmospheric air has traversed said gap.

17. The system of claim 10 wherein said controller is further configured to cause a combination of naturally cool air and artificial air conditioned cooled air to enter the gap when the naturally cool air is near the transition temperature of the phase change material.

18. A thermal insulation system for residential and/or commercial buildings comprising:

a packaged phase change material positioned within said residential and/or commercial buildings adjacent to a wall or ceiling such that an air plenum exists between the packaged phase change material and wall or ceiling, said wall or ceiling subject to uncontrolled external atmospheric conditions, including solar-generated heat, said phase change material configured to store solar-generated heat entering said residential and/or commercial buildings but prior to said solar-generating heat reaching an internal living or working space associated with residential and/or commercial buildings;

an insulation layer positioned against said packaged phase change material, said insulation layer on a surface opposite said plenum;

an electromechanical air conditioner system for producing artificial air conditioned cooled air and directing the artificial air conditioned cooled air through said plenum to facilitate a phase change of the packaged phase change material, said air conditioner system configured to send the artificial air conditioned cooled air directly to said gap without first sending said artificial air conditioned cooled air to the internal living or working space associated with residential and/or commercial buildings;

means for forcing or drawing naturally cool atmospheric air being at a temperature below a threshold temperature through said plenum to facilitate a phase change of the packaged phase change material; and a controller for activating and de-activating said electromechanical air conditioner system and said means for forcing or drawing the naturally cool atmospheric air external to said residential and/or commercial buildings causing the naturally cool atmospheric air, the artificial air conditioned cooled air or a combination thereof to enter into said gap to selectively facilitate a phase change of the phase change material, said controller further configured to:

a. cause the naturally cool air to enter said gap when naturally cool air is being at a temperature below a transition temperature of said phase change material; and b. cause the artificial air conditioned cooled air below the transition temperature of the phase change material to enter into said gap when the naturally cool air is above the transition temperature of said phase change material; and said controller responsive automatically to one or more of the following parameters:

a. temperature of air adjacent to said phase change material;

b. external air temperature;

c. state of said phase change material; and d. time of day.

19. The system of claim 18 wherein the phase change material is contained within a series of vacuum cells and attached to said layer of insulation.

20. The system of claim 18 further comprising a fan or blower for forcing naturally cool atmospheric air external to said residential and/or commercial buildings into said gap.

21. The system of claim 18 further comprising a vacuum for drawing naturally cool atmospheric air external to said residential and/or commercial buildings into said gap.

22. The system of claim 18 further comprising an outlet and means for actively exhausting cooled air or naturally cool atmospheric air once cooled air or naturally cool atmospheric air has traversed said plenum.

23. The system of claim 18 wherein said controller is further configured to cause a combination of naturally cool air and artificial air conditioned cooled air to enter the gap when the naturally cool air is near the transition temperature of the phase change material.

24. A method of insulating residential and/or commercial buildings whereby said residential and/or commercial buildings include a wall or ceiling and packaged phase change material separated by a gap, said wall or ceiling subject to uncontrolled external atmospheric conditions, including solar-generated heat, said phase change material positioned to store solar-generated heat entering said residential and/or commercial buildings but prior to said solar-generating heat reaching an internal living or working space associated with residential and/or commercial buildings, comprising:

controlling activation and de-activation of an electromechanical air conditioning system for producing artificial air conditioned cooled air wherein said electromechanical air conditioning system is configured to send the artificial air conditioned cooled air directly to said gap without first sending the artificial air conditioned cooled air to the internal living or working space associated with residential and/or commercial buildings; and directing the naturally cool atmospheric air external to said residential and/or commercial buildings, the artificial air conditioned cooled air or a combination thereof into said gap to selectively facilitate a phase change of the phase change material, further directing:

a. the naturally cool air to enter into said gap when naturally cool air is being at a temperature below a transition temperature of said phase change material; and b. the artificial air conditioned cooled air being at a temperature below the transition temperature of the phase change material to enter into said gap when the naturally cool air is above the transition temperature of said phase change material; and said controller responsive automatically to one or more of the following parameters:

a. temperature of air adjacent to said phase change material;

b. external air temperature;

c. state of said phase change material; and d. time of day.

25. The method of claim 24 further comprising positioning a layer of insulation adjacent said packaged phase change material on a side opposite said gap.

26. The method of claim 24 further comprising utilizing a fan or blower for directing naturally cool atmospheric air external to said residential and/or commercial buildings into said gap.

27. The method of claim 24 further comprising utilizing an air intake device for directing naturally cool atmospheric air external to said residential and/or commercial buildings into said gap.

28. The method of claim 24 further comprising directing a combination of naturally cool air and artificial air conditioned cooled air to enter the gap when the naturally cool air is near the transition temperature of the phase change material.

29. A method of insulating said residential and/or commercial buildings whereby said residential and/or commercial buildings include a wall or ceiling and packaged phase change material separated by a gap, said wall or ceiling subject to uncontrolled external atmospheric conditions, including solar-generated heat, said phase change material positioned to store solar- generated heat entering said residential and/or commercial buildings but prior to said solar- generating heat reaching an internal living or working space associated with residential and/or commercial buildings comprising:

controlling activation and de-activation of an electromechanical air conditioning system air said electromechanical air conditioning system configured to produce artificially air conditioned cooled air and send artificial air conditioned cooled air directly to said gap without first sending the artificial air conditioned cooled air to the internal living or working space associated with residential and/or commercial buildings; and directing the naturally cool atmospheric air external to said residential and/or commercial buildings, the artificial air conditioned cool air or a combination thereof to enter into said gap to selectively facilitate a phase change of the phase change material, further directing:

a. the naturally cool air to enter into said gap when the naturally cool air is being at a temperature below a transition temperature of said phase change material; and b. the artificial air conditioned cooled air being at a temperature below the transition temperature of the phase change material to enter said gap when the naturally cool air is above the transition temperature of said phase change material; and configuring said electromechanical air conditioning system and means for directing to respond automatically to one or more of the following parameters:

a. temperature of air adjacent to said phase change material;

b. external air temperature;

c. state of said phase change material; and d. time of day.

30. The method of claim 29 further comprising directing a combination of naturally cool air and artificial air conditioned cooled air to enter the gap when the naturally cool air is near the transition temperature of the phase change material.

31. A thermal insulation system for residential and/or commercial buildings comprising:

a packaged phase change material positioned within said residential and/or commercial buildings adjacent to a wall or ceiling such that a gap exists between the packaged phase change material and wall or ceiling, said wall or ceiling subject to uncontrolled external atmospheric conditions, including solar-generated heat, said phase change material positioned to store solar- generated heat entering said residential and/or commercial buildings but prior to said solar- generating heat reaching an internal living or working space associated with residential and/or commercial buildings;

an electromechanical air conditioning system for producing artificial air conditioned cooled air, said electromechanical air conditioning system configured to send artificial air conditioned cooled air directly to said gap without first sending the artificial air conditioned cooled air to the internal living or working space associated with residential and/or commercial buildings; and means for controlling an opening to allow the naturally cool atmospheric air external to said residential and/or commercial buildings, the artificial air conditioned air or a combination thereof into to selectively facilitate a phase change of the packaged phase change material, said controller further configured to:

a. cause the naturally cool air to enter into said gap when naturally cool air is being at a temperature below a transition temperature of said phase change material; and b. cause the artificial air conditioned cooled air below the transition temperature of the phase change material to enter into said gap when the naturally cool air is above the transition temperature of said phase change material; and wherein said electromechanical air conditioning system and means for controlling are responsive automatically to one or more of the following parameters:

a. temperature of air adjacent to said phase change material;

b. external air temperature;

c. state of said phase change material; and d. time of day.

32. The system of claim 31 further comprising air-moving means for forcing naturally cool atmospheric air external to said residential and/or commercial buildings into said gap.

33. The system of claim 31 further comprising air intake means for drawing naturally cool atmospheric air external to said residential and/or commercial buildings into said gap.

34. The system of claim 31 further comprising one or more sensors for measuring a temperature of the naturally cool atmospheric air external to said residential and/or commercial buildings and a temperature adjacent to the phase change material.

35. The system of claim 31 wherein said controller is further configured to cause a combination of naturally cool air and artificial air conditioned cooled air to enter the gap when the naturally cool air is near the transition temperature of the phase change material.

* * * * *